United States Patent [19]
Beard

[11] 3,924,101
[45] Dec. 2, 1975

[54] OVEN TEMPERATURE SENSING CIRCUITRY

[75] Inventor: Dale A. Beard, New Carlisle, Ohio

[73] Assignee: General Motors Corporation, Detroit, Mich.

[22] Filed: Nov. 27, 1974

[21] Appl. No.: 527,585

[52] U.S. Cl. .................. 219/490; 219/494; 219/504
[51] Int. Cl.² ........................................... H05B 1/02
[58] Field of Search ........... 219/412, 413, 490, 492, 219/494, 501, 504, 505, 506; 340/147 P

[56] References Cited
UNITED STATES PATENTS
| | | | |
|---|---|---|---|
| 3,495,070 | 2/1970 | Zissen | 219/506 X |
| 3,566,355 | 2/1971 | Smith | 340/147 P |
| 3,819,906 | 6/1974 | Gould | 219/506 |

Primary Examiner—J. D. Miller
Assistant Examiner—Fred E. Bell
Attorney, Agent, or Firm—Albert F. Duke

[57] ABSTRACT

An oven temperature sensing circuit includes a capacitor and a thermistor forming the RC network of an oscillator. Voltage reference generator means provide a first or second calibrating voltage across the thermistor depending upon whether the oven is operating in a BAKE or CLEAN mode. Current through the thermistor is converted to a voltage which controls a current source which charges the capacitor with a current proportional to the current flowing through the thermistor thereby varying the frequency of the oscillator as a function of temperature.

3 Claims, 2 Drawing Figures

OVEN TEMPERATURE SENSING CIRCUITRY

This invention relates to temperature sensing circuits and more particularly, to oven temperature sensing circuitry which is compatible with MOS integrated circuitry.

Various oven temperature setting and control circuits have been proposed in the prior art. For example, the U.S. Pat. to Gould, Jr. No. 3,775,591, assigned to the assignee of the present invention, discloses circuitry for controlling an oven temperature as a function of the difference in frequency between a reference oscillator and a sense oscillator. The reference oscillator produces an output frequency which is determined by its internal RC network. The sense oscillator has an internal RC network where the capacitor is of the same value as that of the reference oscillator but the resistor is temperature sensitive and is located within the oven so that as the oven temperature increases the frequency of the sense oscillator decreases. The difference in frequency between the sense oscillator and the reference oscillator is converted to a digital value and stored and compared with a desired oven temperature. The oven heater element is then controlled in accordance with whether the actual temperature is below or above the desired temperature.

In the U.S. Pat. to Gould, Jr. No. 3,819,906, assigned to the assignee of the present invention, a typical range is disclosed which utilizes MOS integrated circuitry for controlling and displaying various functions of the range. When the temperature sensing approach of the first mentioned Gould, Jr. patent is employed in a range such as that disclosed in the latter Gould, Jr. patent, the active components of the sense and reference oscillator are located on the MOS chip. Because of the current limitations associated with MOS circuitry the nominal resistance value of the temperature dependent resistor of the sense oscillator must be quite large in order to avoid excessive current flow. This requires that the resistor be wound with very thin wire which increases cost and decreases reliability.

In a self-cleaning oven of the type disclosed in Gould, Jr. U.S. Pat. No. 3,819,906, it is desirable during manufacture of the oven to calibrate the temperature sensing circuit for both the CLEAN and BAKE modes of operation. However, during service of the oven, recalibration of the circuit for the BAKE mode may be requested by the user and it is highly desirable that such recalibration of the circuit for the BAKE mode does not affect the factory calibration for the CLEAN mode.

It is, therefore, an object of the present invention to provide an improved temperature sensing circuit which is compatible with MOS integrated circuitry and which permits use of a relatively low resistance and low cost temperature sensor.

It as another object of the present invention to provide an oven temperature sensing circuit which permits independent and non-interactive calibration for the BAKE and CLEAN modes of operation.

In accordance with the present invention, a thermistor of relatively low nominal resistance is utilized in the temperature sensing circuit and a reference voltage generator is provided for maintaining the voltage across the sensor constant. Accordingly, the current flowing through the thermistor is a function of the resistance of the thermistor and thus the temperature of the oven. The current flowing through the thermistor is converted to a voltage and applied to a voltage controlled current source interconnected with a capacitor. The current supplied by the source to charge the capacitor tracks the current flowing in the thermistor but is of a much smaller value so that when the capacitor is discharged by the MOS circuit the discharge current is within the limits of the capability of the MOS circuitry.

Other objects and advantages of the present invention will be more apparent from the following detailed description which should be read in conjunction with the drawings in which.

Figure 1:
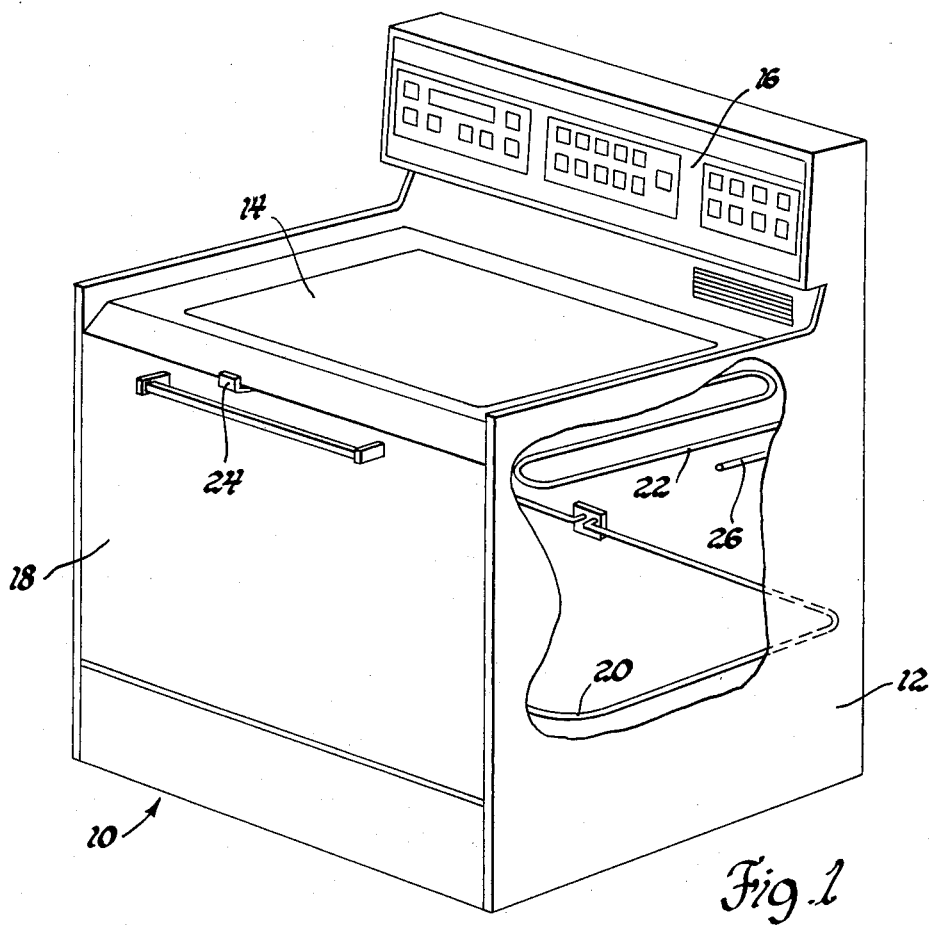
FIG. 1 is a perspective view of a range including an oven compartment having a temperature sensor located therein.

Referring now to the drawings and initially to FIG. 1, an electric range of the type disclosed in the U.S. Pat. to Gould, Jr. No. 3,819,906 is generally designated 10 and includes an upstanding substantially box-like metal body 12 having a substantially horizontal ceramic glass cooking top 14. An upstanding control and display panel 16 is located at the rear of the cooking top 14. An oven door 18 provides access to an oven cooking area including a BAKE heating element 20 located at the bottom of the oven and a BROIL heating element 22 located at the top of the oven. An actuator 24 is provided for actuating an oven door locking mechanism (not shown) during the oven cleaning mode of operation. A temperature sensing element 26 is located within the oven for sensing the temperature of the oven cooking area.

Figure 2:
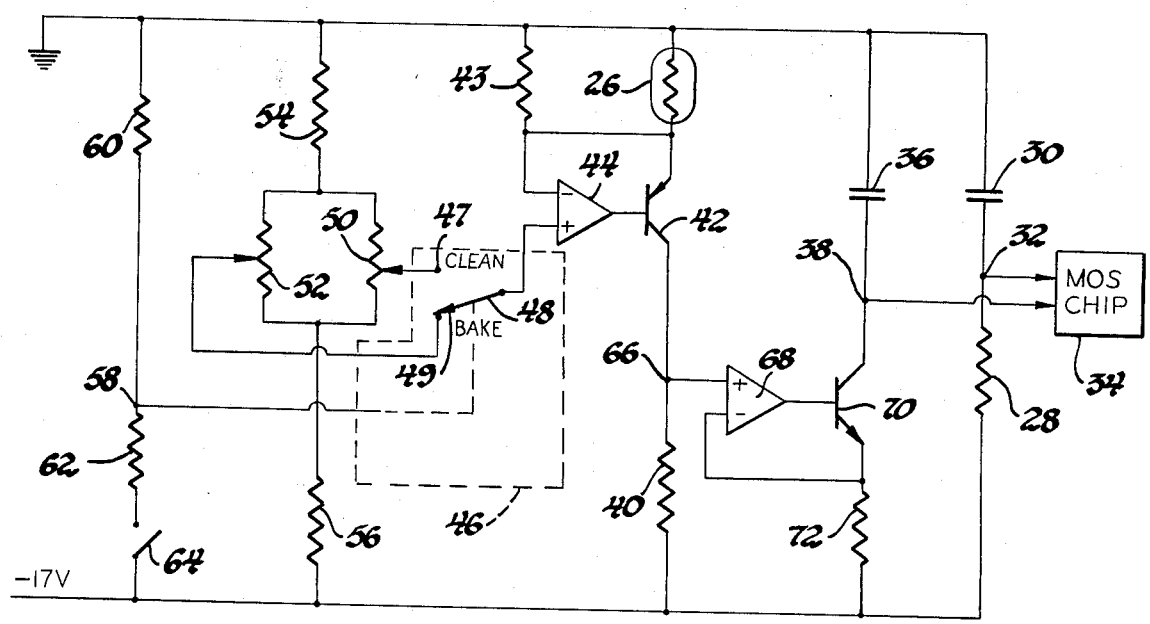
FIG. 2 is a detailed schematic diagram of the oven sensing circuit of the present invention.

Referring now to FIG. 2, an RC network comprising a resistor 28 and a capacitor 30 are connected across a 17 volt DC supply. The junction 32 is connected with metal oxide semiconductor (MOS) integrated circuitry generally designated 34 which coordinates the control and display functions of the range 10 in accordance with entries supplied by the user to the panel 16. The resistor 28 and capacitor 30 cooperate with active devices on the MOS circuit 34 to form a reference oscillator. A capacitor 36 responsive to a current proportional to the current flowing in the thermistor 26 is connected at junction 38 with the MOS chip 34 and cooperates with additional active devices in the chip 34 to provide a sense oscillator the frequency of which is proportional to the temperature in the oven.

The thermistor 26 is connected in a series with a current-to-voltage converter comprising a resistor 40 through the emitter-collector electrodes of a transistor 42. A resistor 43 is provided in shunt with the thermistor 26 to compensate for non-linearity in the temperature-resistance characteristic of the thermistor 26. The emitter-base electrodes of the transistor 44 are included in the feedback loop between the output and inverting input of an operational amplifier 44. A calibration voltage is applied to the non-inverting input of the operational amplifier 44 through an analog switch generally designated 46 such as the Motorola MC 14007. The analog switch 46 is schematically illustrated as a single pole double throw switch having an armature 48 movable between terminals 47 and 49 designated CLEAN and BAKE respectively. The terminal 47 is connected with the wiper arm of a potentiometer 50 while the terminal 49 is connected with the wiper arm of a potentiometer 52. The potentiometers 50 and 52 are connected in parallel with each other and across the source through voltage dividing resistors 54 and 56. The input to the analog switch 46 is from the junction 58 of a voltage divider network comprising resistors 60 and 62 which are serially connected across the source through a switch 64. The switch 64 responds to the position of the actuator 22 so that the switch 64 is opened in a BAKE mode of operation and is closed when the oven is latched in the CLEAN mode of operation. The analog switch 46 responds to the voltage at the junction 58 so that the voltage applied to the non-inverting input of the amplifier 44 is derived from the BAKE potentiometer 52 when the switch 64 is opened and from the CLEAN potentiometer 50 when the switch 64 is closed. The operational amplifier 44 is connected in a voltage follower configuration and accordingly, the voltage at the emitter of the transistor 42 is maintained at the reference voltage established at the non-inverting input of the amplifier 44. The constant voltage at the emitter of the transistor 42 permits current flow through the thermistor 26 to be proportional to the resistance of the thermistor 26 and, therefore, proportional to the temperature of the oven. By including the base-emitter junction of the transistor 42 and the feedback path of the amplifier 44, variations in the voltage across the base-emitter junction of the transistor 42 with temperature and current flow through the thermistor 26 is compensated so that the voltage at the emitter remains essentially constant with temperature and load variations.

The current through the thermistor 26 also flows through the resistor 40 and is converted to a voltage at the junction 66. The voltage at the junction 66 is applied to a voltage controlled current source comprising operational amplifier 68, transistor 70, and resistor 72. The amplifier 68 maintains the voltage at the emitter of the transistor 70 at the voltage established at the junction 66. The charging current for the capacitor 36 is thus proportional to the current in the thermistor 26 by the ratio of the resistor 40 to the resistor 72. When the capacitor 36 charges to the threshold voltage of the active devices in the MOS chip 34 to which it is connected, the capacitor discharges substantially instantaneously through the MOS chip 34.

Typical values of the components shown in FIG. 2 are as follows:

| Resistors | Capacitors |
| --- | --- |
| 26 — 15 ohms | 30, 36 — .01 microfarads |
| 28 — 21 K ohms | |
| 40 — 200 ohms | |
| 43 — 150 ohms | |
| 50 — 20 ohms | |
| 52 — 20 ohms | |
| 54 — 39 ohms | |
| 56 — 2.2 K ohms | |
| 60 — 1.2 K ohms | |
| 62 — 3.9 K ohms | |
| 72 — 7.8 K ohms | |

Having thus described my invention, what I claim is:

1. A temperature sensing circuit for an oven operable in either a BAKE or CLEAN mode, said circuit supplying an input to an MOS integrated circuit and comprising temperature sensitive resistor means, first and second potentiometer means for establishing first and second calibration voltages, first switch means having a first position when said oven is in said BAKE mode and a second position when said oven is in said CLEAN mode, means responsive to the position of said first switch means for applying said first calibration voltage across said temperature sensitive resistor means when said first switch means is in said first position and for applying said second calibration voltage across said temperature sensitive resistor means when said first switch means is in said second position, current-to-voltage converter means for developing a voltage proportional to the current flowing in said temperature sensitive resistor means, a capacitor, means for supplying a charging current to said capacitor proportional to the voltage developed by said converter means, means connecting said capacitor with said MOS integrated circuit to provide a discharge path for said capacitor.

2. An oven temperature sensing circuit comprising a first transistor having emitter, base, and collector electrodes, means including a temperature sensing resistor connecting the emitter of said transistor to a first point of direct current potential, means including a first resistor connecting the collector electrode of said transistor to a different point of potential relative to said first point, reference voltage generator means for maintaining a constant calibration voltage at the emitter of said transistor, said voltage generator means comprising an operational amplifier having inverting and non-inverting inputs and an output, means connecting the emitter of said first transistor to one of said inputs, means for establishing a calibration voltage at the other of said inputs, means connecting said output to the base of said first transistor, voltage controlled current source means including a second operational amplifier having inverting and non-inverting inputs and an output, a second transistor having emitter, base and collector electrodes and a second resistor, means connecting one input of said second operational amplifier to the collector electrode of said first transistor, means connecting the output of said second operational amplifier to the base electrode of said second transistor, means connecting the emitter electrode of said second transistor to the other input of said second operational amplifier, said second resistor being connected between said emitter electrode and said different point of potential, a capacitor connected between the collector electrode of said second transistor and said one point of potential whereby said capacitor is charged by a current proportional to the current through said temperature sensing resistor.

3. A temperature sensing circuit for an oven operable in either a BAKE or CLEAN mode, said circuit supplying an input to an MOS integrated circuit and comprising a first transistor having emitter-base collector electrodes, a temperature sensing resistor connecting the emitter of said transistor to a first point of direct current potential, a first resistor connecting the collector electrode of said transistor to a second point of potential relative to said first point, reference voltage generator means for maintaining a constant calibration voltage at the emitter of said transistor, said voltage generator means comprising an operational amplifier having inverting and non-inverting inputs and an output, means connecting said output to the base of said first transistor, means connecting the emitter of said first transistor to one of said inputs, means for establishing a first or second calibration voltage depending upon whether said oven is in said BAKE or CLEAN mode and comprising first and second potentiometer means connected between said points of potential for developing said first and second calibration voltages respectively, the voltage developed by said first potentiometer means being independent of and non-interactive with the voltage developed by said second potentiometer means, switch means having a first position when said oven is in said BAKE mode and a second position when said oven is in said CLEAN mode, voltage divider means for establishing a first voltage when said switch is in said first position and a second voltage when said switch is in said second position, analog switch means responsive to said first and second voltages for applying said first or said second calibration voltages to the other input of said operational amplifier when said switch is in said first position or said second position respectively, voltage controlled current source means including a second operational amplifier having inverting and non-inverting inputs and an output, a second transistor having emitter, base and collector electrodes and a second resistor, means connecting one input of said second operational amplifier to a junction between the collector electrode of said first transistor and said first resistor, means connecting the output of said second operational amplifier to the base electrode of said second transistor, means connecting the emitter electrode of said second transistor to the other input of said second operational amplifier, said second resistor connecting said emitter electrode to said second point of potential, a capacitor connected between the collector electrode of said second transistor and said first point of potential, means connecting said capacitor with said MOS integrated circuit whereby said capacitor is charged by a current proportional to the current through said temperature sensing resistor and is discharged through said MOS integrated circuit.

* * * * *